United States Patent [19]

Miyazaki et al.

[11] Patent Number: 4,803,137
[45] Date of Patent: Feb. 7, 1989

[54] NON-AQUEOUS ELECTROLYTE SECONDARY CELL

[75] Inventors: Tadaaki Miyazaki, Higashiyamato; Takao Ogino, Tokorozawa; Yoshitomo Masuda, Tachikawa; Takahiro Kawagoe, Tokorozawa, all of Japan

[73] Assignee: Bridgestone Corporation, Tokyo, Japan

[21] Appl. No.: 185,995

[22] Filed: Apr. 25, 1988

[30] Foreign Application Priority Data

May 19, 1987 [JP] Japan .................................. 62-120216
Jun. 5, 1987 [JP] Japan .................................. 62-141258

[51] Int. Cl.⁴ ............................................. H01M 6/14
[52] U.S. Cl. .................................... 429/194; 429/218; 252/182.1

[58] Field of Search ............... 429/194, 196, 197, 218; 252/182.1

[56] References Cited

U.S. PATENT DOCUMENTS 4,310,609  1/1982  Liang et al. ......................... 429/194
4,497,726  2/1985  Brule et al. ...................... 429/218 X
4,758,484  7/1988  Furukawa et al. .................. 429/194

Primary Examiner—Anthony Skapars
Attorney, Agent, or Firm—Oblon, Fisher, Spivak, McClelland & Maier

[57] ABSTRACT

A non-aqueous electrolyte secondary cell is provided which comprises a positive electrode active material of a modified vanadium pentoxide, a negative electrode active material of lithium or lithium alloy, and a non-aqueous electrolyte.

4 Claims, 4 Drawing Sheets

NON-AQUEOUS ELECTROLYTE SECONDARY CELL

BACKGROUND OF THE INVENTION

1. Field of the Invention

This invention relates to a non-aqueous electrolyte secondary cell, and more particularly, to a stable, reliable, rechargeable non-aqueous electrolyte secondary cell having a high energy density and an extended charge/discharge life.

2. Discussion of Prior Art

A number of proposals have been made on high energy density cells using lithium as negative electrode active material. There are already commercially available lithium cells which use graphite fluoride or manganese dioxide as the positive electrode active material. These cells, however, are primary cells and cannot be charged again.

Secondary cells using lithium as negative electrode active material are also known. They use chalcogenides (sulfides, selenides or tellurides) of titanium, molybdenum, niobium, vanadium, and zirconium as the positive electrode active material. However, few cells were commercially available because cell performance and economy are unsatisfactory. Recently, a secondary cell using molybdenum sulfide has been commercially marketed although it has a low discharge potential and is liable to failure by over-charging. The positive electrode active materials which are known to provide a high discharge potential are chromium oxide and vanadium pentoxide. However, chromium oxide has poor charge/discharge cycle performance and vanadium pentoxide is less conductive and hence, unsatisfactory in cathode properties.

Japanese Patent Application Kokai No. 50-54836 discloses a non-aqueous electrolyte secondary cell comprising a negative electrode of metallic lithium and a positive electrode of titanium disulfide $TiS_2$. This cell, however, has a potential as low as 2 volts on average because the redox potential of titanium disulfide is low. The cell also has poor cycle performance because dendrites generate on the metallic lithium negative electrode upon charging.

To control the dendrite formation, Japanese Patent Application Kokai No. 52-5423 proposes to use a lithium-aluminum alloy containing 63 to 92 atom% of lithium as the negative electrode. The resulting cell is improved in cycle performance, but has a further lowered potential.

On the other hand, a secondary cell having a high potential is obtained by using metallic lithium as the negative electrode and vanadium pentoxide $V_2O_5$ as the positive electrode as disclosed in Japanese Patent Application Kokai No. 48-60240 and W. B. Ehner and W. C. Merz, Roc 28th Power Sources Sympo., June 1978, page 214. This cell, however, is also poor in cycle performance because the negative electrode is formed of metallic lithium. Another problem is that vanadium pentoxide is less conductive. When metallic lithium for the negative electrode is replaced by a lithium-aluminum alloy, the resulting cell is substantially improved in cycle performance, but undesirably has a reduced capacity at a voltage of 2 volts or higher.

One primary use of lithium secondary cells is a backup power supply for IC memories. In such application, a voltage of less than 2 volts is insufficient for a cell to function as a memory backup. The capacity of a cell at a voltage of 2 volts or higher is important.

There is a need for a stable, reliable lithium secondary cell having a high energy density and an extended charge/discharge life.

SUMMARY OF THE INVENTION

An object of the present invention is to provide a stable, reliable non-aqueous electrolyte secondary cell.

Another object of the present invention is to provide a non-aqueous electrolyte secondary cell having a high energy density and an extended charge/discharge life.

A further object of the present invention is to provide a non-aqueous electrolyte lithium secondary cell in which a positive electrode active material having high conductivity and a high capacity is used to achieve a high energy density while minimizing the amount of a conductive aid added.

A still further object of the present invention is to provide a non-aqueous electrolyte lithium secondary cell exhibiting an increased potential and improved cycle performance.

According to the present invention, there is provided a non-aqueous electrolyte secondary cell comprising a positive electrode active material selected from materials represented by formulae (1) through (6):

  $Li_xMo_xV_{2-x}O_5$ (1)

  $Li_xW_xV_{2-x}O_5$ (2)

  $Li_yMo_zV_{2-z}O_5$ (3)

  $Li_yW_zV_{2-z}O_5$ (4)

  $Li_{m+n}Mo_mW_nV_{2-m-n}O_5$ (5)

  $\beta\text{-}Li_qV_2O_5$ (6)

wherein $x \leq 1$, $z < y \leq 1$, $m+n \leq 1$, and $0.1 \leq q \leq 0.6$, a negative electrode active material of lithium or a lithium alloy capable of occluding and releasing lithium, and an electrolyte consisting essentially of a non-aqueous material which allows lithium ions to migrate for electrochemical reaction with the positive electrode active material.

BRIEF DESCRIPTION OF THE DRAWINGS

These and other objects, features, and advantages of the present invention will be better understood by reading the following description taken in conjunction with the accompanying drawings, in which.

DETAILED DESCRIPTION OF THE INVENTION

Figure 1:
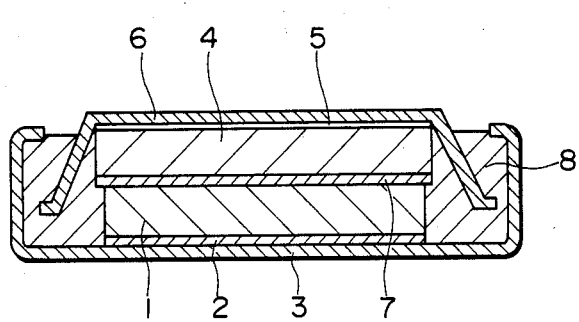
FIG. 1 is a schematic cross-sectional view of a cell used in a charge/discharge test.

We have made investigations on a material useful as the positive electrode active material for a non-aqueous electrolyte lithium secondary cell. Ideal vanadium pentoxide has the five electrons in the 3d and 4s orbits of vanadium (pentavalent) attached to oxygen atoms so that it has no conductivity. Vanadium pentoxide can be modified into compounds of the foregoing formulae (1) through (5) by replacing some of vanadium by molybdenum and/or tungsten having a larger ionic radius and partially introducing lithium. These modified compounds have excellent properties as positive electrode active material. More particularly, these compounds not only exhibit improved conductivity because tetravalent vanadium is created to impart hopping conduction to the compound, but are also liable to topochemical reaction with lithium because of a distorted structure. When the compounds of formulae (1) through (5) are used as the positive electrode active material for non-aqueous electrolyte lithium secondary cells, the cells exhibit substantially improved charge/discharge performance. The compound of formula (6) also has improved properties as the positive electrode active material. When these compounds are combined with a negative electrode active material in the form of a lithium alloy such as lithium-aluminium alloy and with an electrolyte in the form of $LiClO_4$, $LiAsF_6$, $LiPF_6$ or a mixture thereof, there is obtained a non-aqueous electrolyte secondary cell having a high potential, a high energy density and an extended charge/discharge life so that it is very useful as a backup power supply for IC memories.

The invention will be described in further detail. The secondary cell of the present invention uses a positive electrode active material selected from materials represented by formulae (1) through (6):

$$Li_xMo_xV_{2-x}O_5 \quad (1)$$

$$Li_xW_xV_{2-x}O_5 \quad (2)$$

$$Li_yMo_zV_{2-z}O_5 \quad (3)$$

$$Li_yW_zV_{2-z}O_5 \quad (4)$$

$$Li_{m+n}Mo_mW_nV_{2-m-n}O_5 \quad (5)$$

$$\beta\text{-}Li_qV_2O_5 \quad (6)$$

wherein $x \leq 1$, $z < y \leq 1$, $m+n \leq 1$, and $0.1 \leq q \leq 0.6$.

In the formulae, it suffices that x, y, and m+n each are up to 1. The lower limits of x, y, z and m+n are preferably 0.005, 0.1, 0.05 and 0.1, respectively. Preferably, x, y, and m+n each range from 0.1 to 0.7. Also, z preferably ranges from 0.1 to 1, m and n each preferably range from 0.05 to 5 and q preferably ranges from 0.2 to 0.4.

The positive electrode is prepared from the foregoing active material in powder form. The particle size of the material is not particularly limited although a high performance positive electrode is obtained with active material having an average particle size of up to 3 μm. The positive electrode may be prepared by adding a conductive agent such as acetylene black, a binder such as fluoroplastic powder, and an organic solvent to the active material, kneading the mixture, and milling the mixture through rolls, followed by drying. Since the positive electrode active materials of formulae (1) through (6) are satisfactorily conductive, the conductive agent may be added in a relatively small amount, preferably in an amount of from about 3 to about 25 parts, more preferably from about 5 to about 15 parts by weight per 100 parts by weight of the positive electrode active material. The binder may preferably be added in an amount of from about 2 to about 25 parts by weight per 100 parts by weight of the positive electrode active material. The positive electrode active materials of formulae (1) through (6) may be used alone or in admixture of two or more of them.

The positive electrode active material of formula (1), (2) or (5) may be prepared, for example, by adding $MoO_2$ and/or $WO_2$ to $V_2O_5$, further adding $Li_2O$ or $Li_2CO_3$ thereto, and heating the mixture at a temperature of 500° to 700° C. for 3 to 48 hours in an inert gas such as nitrogen and argon.

The positive electrode active material of formula (3) or (4) may be prepared, for example, by adding $MoO_2$ and $VO_2$ or $WO_2$ and $VO_2$ to $V_2O_5$, further adding $Li_2O$ or $Li_2CO_3$ thereto, and heating the mixture at a temperature of 500° to 700° C. for 3 to 48 hours in an inert gas such as nitrogen and argon.

The positive electrode active material of formula (6) may be prepared, for example, by adding 8/5 moles of $Li_2O$ or $Li_2CO_3$ to $V_2O_5$, and heating the mixture at a temperature of 500° to 680° C. for 3 to 48 hours in an inert gas.

The secondary cell of the present invention uses lithium or a lithium alloy capable of occluding and releasing lithium as the negative electrode active material. The lithium alloys used herein includes alloys of lithium with at least one metal selected from the metals of Groups IIa, IIb, IIIa, IVa, and Va in the Periodic Table. Preferred are alloys of lithium with at least one metal selected from Al, In, Sn, Pb, Bi, Cd and Zn. The most preferred alloy is a lithium-aluminum alloy. The lithium alloy preferably contains about 10 to about 60 atom% of lithium, more preferably about 25 to about 40 atom% of lithium. Better results are obtained with the use of a lithium alloy having a lithium content in this range, particularly a lithium-aluminum alloy having a lithium content in this range.

The lithium alloy may be prepared by any desired method. For example, a lithium-aluminum alloy may be prepared by a metallurgical melt alloying method or an electrochemical alloying method although an alloy which is electrochemically obtained from an electrolytic solution is preferred. The shape of aluminum used in electrolytic solution may be suitably chosen. A plate of aluminum or a compact of powder aluminum molded with the aid of a binder may be used depending on the type of cell.

The electrolyte used in the secondary cell of the present invention may be any desired non-aqueous material as long as it is chemicaly stable to the positive and negative electrode active materials described above and allows lithium ions to migrate therethrough for electrochemical reaction with the positive and negative electrode active materials. Preferably, the electrolyte is a material having a cation combined with an anion. A typical cation is $Li^+$. Some illustrative, non-limiting examples of the anion include anions of Group Va element halides such as $PF_6^-$, $AsF_6^-$, $SbF_6^-$, and $SbCl_6^-$, anions of Group IIIa element halides such as $BF_4^-$ and $AlCl_4^-$, halide anions such as $I^-(I_3^-)$, $Br^-$, and $Cl^-$, perchlorate anions such as $ClO_4^-$, and $HF_2^-$, $CF_3SO_3^-$, $SCN^-$, etc. Illustrative examples of the compounds having such anions and cations include $LiPF_6$, $LiAsF_6$, $LiSbF_6$, $LiBF_4$, $LiClO_4$, $LiI$, $LiBr$, $LiCl$, $LiAlCl_4$, $LiHF_2$, $LiSCN$, and $LiSO_3CF_3$. Preferred are $LiPF_6$, $LiAsF_6$ $LiBF_4$, $LiClO_4$, $LiSbF_6$, and $LiSO_3CF_3$. $LiClO_4$, $LiAsF_6$ or $LiPF_6$, or a mixture thereof is preferably used when the positive electrode active material is the compound of formula (6).

The electrolytes are generally used as solutions thereof dissolved in solvents. The type of solvent is not particularly limited although preferred are relatively highly polar solvents. Examples of the solvents include propylene carbonate, ethylene carbonate, tetrahydrofuran, 2-methyltetrahydrofuran, dioxolane, dioxane, dimethoxyethane, glymes such as diethyleneglycol dimethyl ether, lactones such as gamma-butyrolactone, phosphate esters such as triethylphosphate, borate esters such as triethyl borate, sulfur compounds such as sulfolane and dimethylsulfoxide, nitriles such as acetonitrile, amides such as dimethylformamide and dimethylacetamide, dimethyl sulfate, nitromethane, nitrobenzene, and dichloroethane, and mixtures thereof. Preferred are ethylene carbonate, propylene carbonate, butylene carbonate, tetrahydrofuran, 2-methyltetrahydrofurane, dimethoxyethane, dioxolane, and gamma-butyrolactone, and mixtures thereof.

The electrolyte used in the secondary cell of the present invention further includes organic solid electrolytes which are obtained by impregnating such polymers as polyethylene oxide, polypropylene oxide, isocyanate-crosslinked polyethylene oxide, and phosphazine polymer having an ethylene oxide oligomer side chain with the above-mentioned electrolyte compounds; and inorganic solid electrolytes, for example, inorganic ion conductors such as $Li_3N$ and $LiBCl_4$ and lithium glass species such as $Li_4SiO_4$ and $Li_3BO_3$.

The secondary cell of the present invention is generally constructed by interposing the electrolyte between the positive and negative electrodes. A separator may be interposed between the positive and negative electrodes in order to prevent the electrodes from contacting each other to cause current shortcircuit. The separator is preferably a porous material which can be impregnated with and allow passage of the electrolyte, for example, woven and non-woven fabrics and nets of synthetic resins such as polytetrafluoroethylene, polypropylene and polyethylene.

Since at least one of the compounds of formulae (1) through (6) having good conductivity and high capacity is used as the positive electrode active material, the secondary cell of the present invention has a high energy density, a high potential, and improved cycle performance, and is stable and reliable.

EXAMPLES

Examples of the present invention are given below by way of illustration and not by way of limitation.

Preparation

Beta-$Li_xM_xV_{2-x}O_5$ was prepared by adding 2x mol of $MO_2$ wherein M is Mo or W and x mol of $Li_2O$ or $Li_2CO_3$ to $(2-x)$ mol of $V_2O_5$, thoroughly mixing the ingredients, and heating the mixture for reaction at 650° C. for 48 hours in an inert gas.

Beta-$Li_{m+n}Mo_mW_nV_{2-m-n}O_5$ was prepared by adding 2m mol of $MoO_2$, 2n mol of $WO_2$, and $(m+n)$ mol of $Li_2O$ or $Li_2CO_3$ to $(2-m-n)$ mol of $V_2O_5$, thoroughly mixing the ingredients, and heating the mixture for reaction at 650° C. for 48 hours in an inert gas.

Beta-$Li_yM_zV_{2-z}O_5$ was prepared by adding 2z mol of $MO_2$ wherein M is Mo or W, $2(y-z)$ mol of $VO_2$ and y mol of $Li_2O$ or $Li_2CO_3$ to $(2-y)$ mol of $V_2O_5$, thoroughly mixing the ingredients, and heating the mixture for reaction at 650° C. for 48 hours in an inert gas.

EXAMPLE 1

A positive electrode was prepared by adding 15 parts by weight of acetylene black and 15 parts by weight of a powder fluoroplastic binder to 100 parts by weight of beta-$Li_{0.25}Mo_{0.25}V_{1.75}O_5$ powder as positive electrode active material, thoroughly mixing the ingredients, adding an organic solvent to the mixture, milling the mixture through rolls to form a film of about 350 μm thick, and drying the film at 150° C. in vacuum. A disk having a predetermined diameter was punched from the dry film.

A negative electrode was prepared by applying lithium to a punched aluminum disk having a predetermined diameter, bonding lithium to the aluminum disk under pressure, and treating the disk in an electrolytic solution to form a lithium-aluminum alloy (molar ratio Li:Al=1:2).

A liquid electrolyte was prepared by dissolving 1 mol of lithium hexafluorophosphate ($LiPF_6$) to 1 liter of a mixture of propylene carbonate and ethylene carbonate in a volume ratio of 1:1.

A cell as shown in FIG. 1 was fabricated using the positive electrode, negative electrode, and liquid electrolyte prepared above.

Referring to FIG. 1, the cell includes a positive electrode 1 which is integrated with a positive electrode current collector 2 of stainless steel which is, in turn, spot welded to the inside surface of a positive electrode casing 3. A negative electrode 4 is spot welded to a negative electrode current collector 5 which is, in turn, bonded to the inside surface of a negative electrode casing 6. A separator 7 of polypropylene non-woven fabric which is impregnated with the liquid electrolyte is interposed between the positive and negative electrodes 1 and 4. The positive and negative electrode casings 3 and 5 are joined together through an insulating gasket 8. The cell has a diameter of 20.0 mm and a thickness of 1.6 mm.

Figure 2:
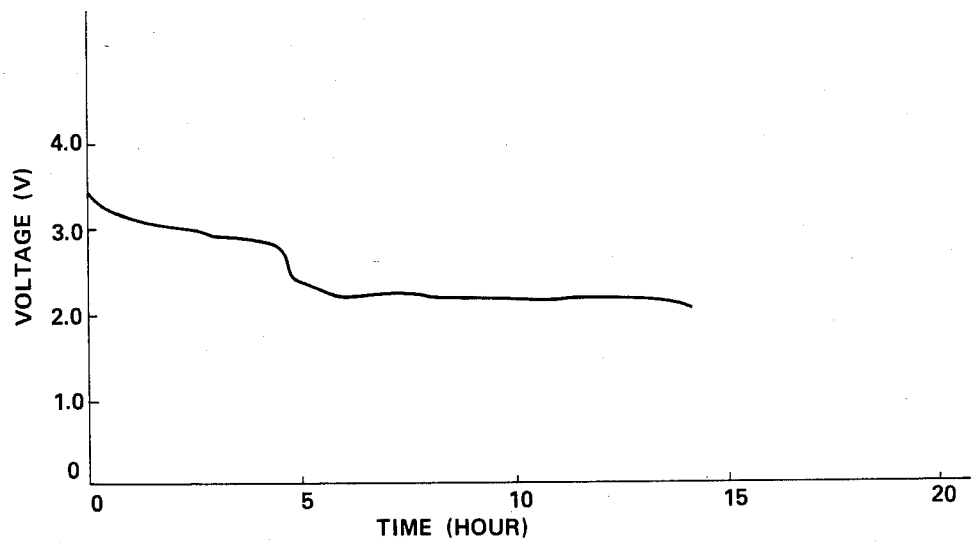
FIGS. 2 to 8 are diagrams showing the discharging curves of cells using $Li_{0.25}Mo_{0.25}V_{1.75}O_5$, $Li_{0.3}W_{0.3}V_{1.7}O_5$, $Li_{0.4}Mo_{0.2}W_{0.2}V_{1.6}O_5$, $Li_{0.3}Mo_{0.1}V_{1.9}O_5$, $Li_{0.3}W_{0.1}V_{1.9}O_5$, $V_2O_5$, and $\beta\text{-}Li_{0.3}V_2O_5$ as the positive electrode active material, respectively.

The cell was subjected to repetitive charging/discharging cycles at a charge/discharge current of 1 mA, a discharge terminating voltage of 2.0V, and a charge terminating voltage of 3.5V. A discharging curve was recorded on the 5th cycle and at the same time, the capacity of the cell was measured. The discharging curve is shown in FIG. 2 and the capacity is reported in Table 1.

EXAMPLE 2

The positive and negative electrodes were prepared by the same procedures as in Example 1 except that the positive electrode active material used was beta-$Li_{0.3}W_{0.3}V_{1.7}O_5$. The liquid electrolyte used was a solution of 1 mol of lithium hexafluoroarsenide ($LiAsF_6$) in 1 liter of a mixture of ethylene carbonate and 2-methyltetrahydrofuran in a volume ratio of 1:1. These components were used to fabricate a cell as shown in FIG. 1 by the same procedure as in Example 1.

Figure 3:
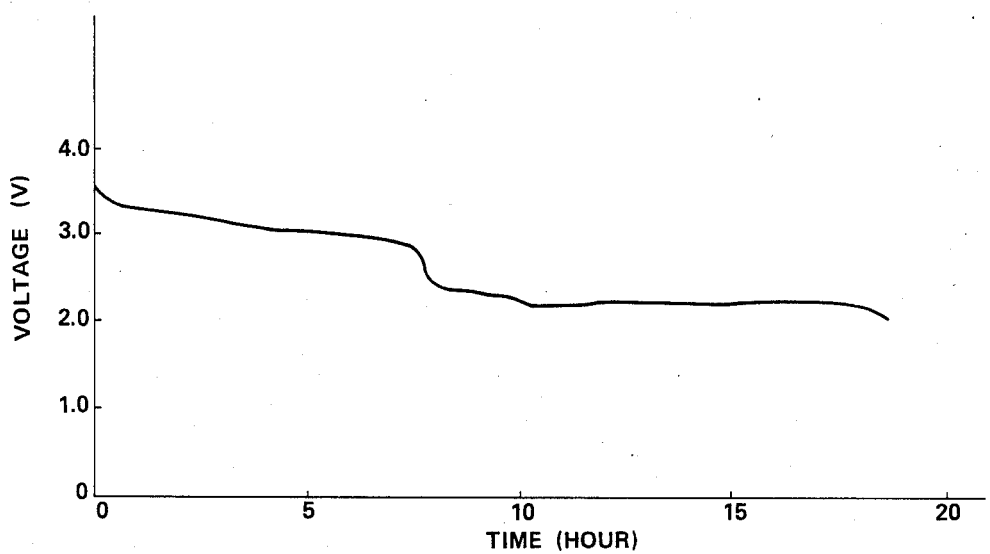

The cell was subjected to the same charge/discharge test as in Example 1. The discharging curve on the 5th cycle is shown in FIG. 3 and the corresponding capacity is reported in Table 1.

EXAMPLE 3

A cell as shown in FIG. 1 was fabricated by the same procedure as in Example 1 except that the positive electrode active material used was beta-$Li_{0.4}Mo_{0.2}W_{0.2}V_{1.6}O_5$.

Figure 4:
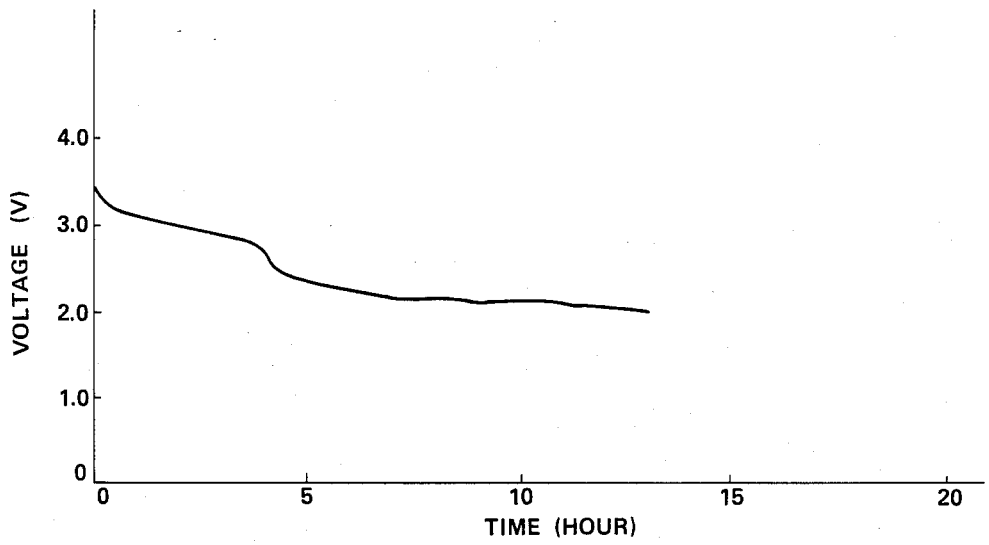

The cell was subjected to the same charge/discharge test as in Example 1. The discharging curve on the 5th cycle is shown in FIG. 4 and the corresponding capacity is reported in Table 1.

EXAMPLE 4

A cell as shown in FIG. 1 was fabricated by the same procedure as in Example 1 except that the positive electrode active material used was beta-$Li_{0.3}Mo_{0.1}V_{1.9}O_5$.

Figure 5:
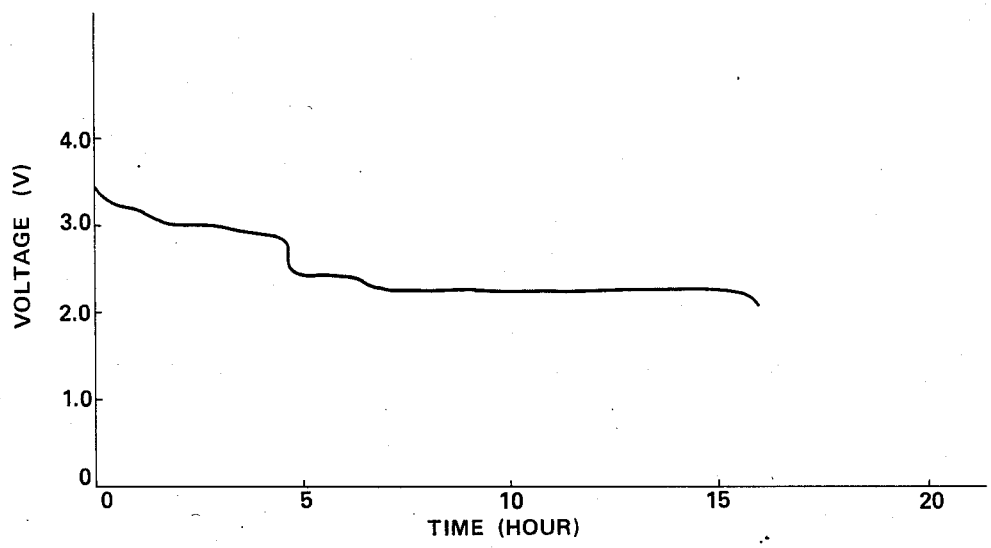

The cell was subjected to the same charge/discharge test as in Example 1. The discharging curve on the 5th cycle is shown in FIG. 5 and the corresponding capacity is reported in Table 1.

EXAMPLE 5

A cell as shown in FIG. 1 was fabricated by the same procedure as in Example 1 except that the positive electrode active material used was beta-$Li_{0.3}W_{0.1}V_{1.9}O_5$.

Figure 6:
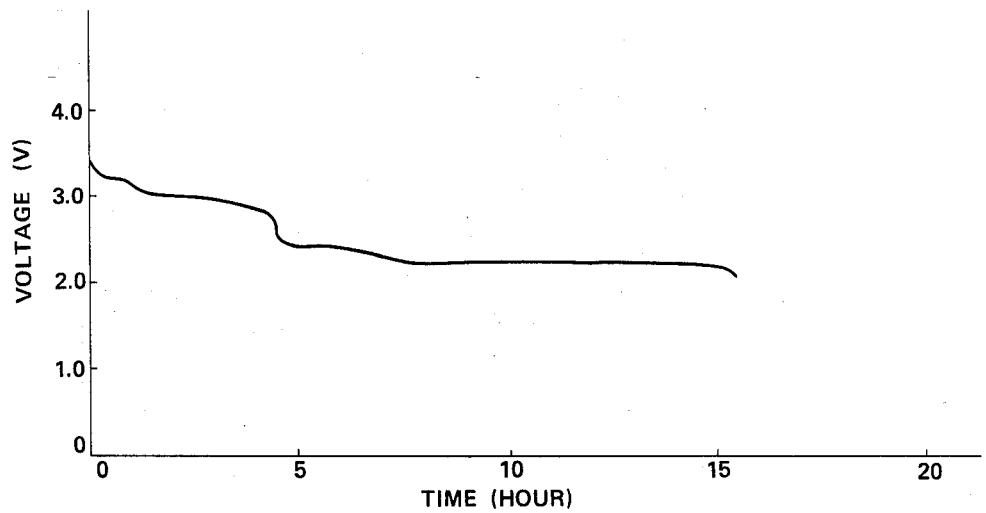

The cell was subjected to the same charge/discharge test as in Example 1. The discharging curve on the 5th cycle is shown in FIG. 6 and the corresponding capacity is reported in Table 1.

COMPARATIVE EXAMPLE

A cell as shown in FIG. 1 was fabricated by the same procedure as in Example 2 except that the positive electrode active material used was $V_2O_5$.

Figure 7:
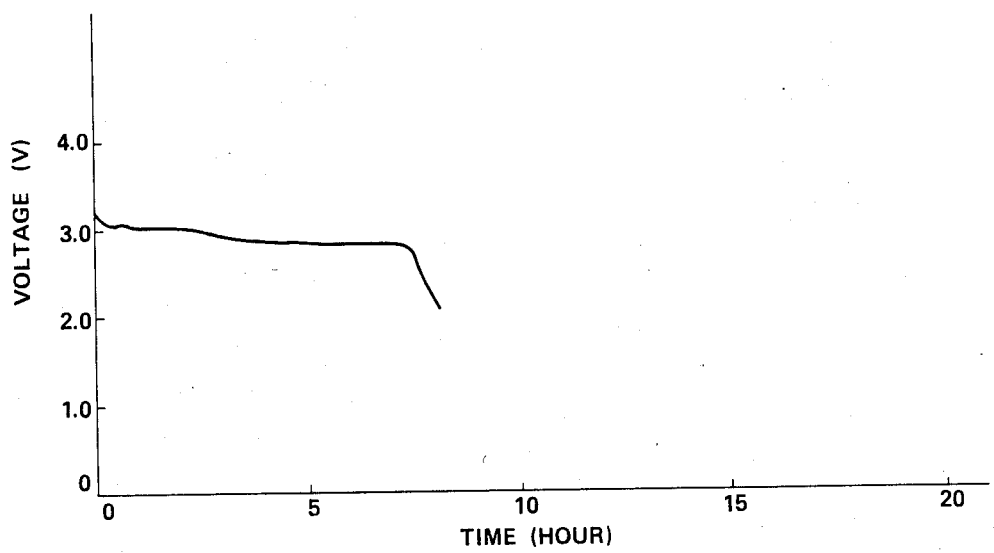

The cell was subjected to the same charge/discharge test as in Example 1 except that the charge terminating voltage was lowered to 3.3V. A charge terminating voltage of 3.3V was used because the charging curve abruptly rose at a higher voltage. The discharging curve on the 5th cycle is shown in FIG. 7 and the corresponding capacity is reported in Table 1.

TABLE 1

| Example | Positive electrode active material | Current (mA) | Capacity (mAH) |
|---------|-----------------------------------|--------------|----------------|
| Example 1 | $Li_{0.25}Mo_{0.25}V_{1.75}O_5$ | 1 | 14 |
| Example 2 | $Li_{0.3}W_{0.3}V_{1.7}O_5$ | 1 | 18.5 |
| Example 3 | $Li_{0.4}Mo_{0.2}W_{0.2}V_{1.6}O_5$ | 1 | 13 |
| Example 4 | $Li_{0.3}Mo_{0.1}V_{1.9}O_5$ | 1 | 16 |
| Example 5 | $Li_{0.3}W_{0.1}V_{1.9}O_5$ | 1 | 15.5 |
| Comparative Example | $V_2O_5$ | 1 | 8 |

Positive electrode sheets were prepared by the same procedure as in Example 1 except that 5 parts by weight of acetylene black and 15 parts by weight of a powder fluoroplastic binder were added to 100 parts by weight of the positive electrode active materials shown in Examples 1 to 3 and Comparative Example. The DC resistance of these positive electrode sheets was measured by a four terminal method. The results are shown in Table 2.

TABLE 2

| Example | Positive electrode active material | DC resistance ($\Omega$/cm) |
|---------|-----------------------------------|------------------------------|
| Example 1 | $Li_{0.25}Mo_{0.25}V_{1.75}O_5$ | 300 |
| Example 2 | $Li_{0.3}W_{0.3}V_{1.7}O_5$ | 290 |
| Example 3 | $Li_{0.4}Mo_{0.2}W_{0.2}V_{1.6}O_5$ | 260 |
| Comparative Example | $V_2O_5$ | $37 \times 10^3$ |

As is evident from the foregoing data, the positive electrode of $V_2O_5$ is less conductive and provides a cell having a Li-Al negative electrode with a lower capacity for operation at a potential of 2 volts or higher whereas the positive electrodes of the beta-type composite oxides used in Examples are fully conductive and provide a cell having a Li-Al negative electrode with a higher capacity for operation at a potential of 2 volts or higher.

EXAMPLE 6

A positive electrode was prepared by adding 15 parts by weight of acetylene black and 15 parts by weight of a powder fluoroplastic binder to 100 parts by weight of beta-$Li_{0.3}V_2O_5$ powder having an average particle size of 0.19 μm as positive electrode active material, thoroughly mixing the ingredients, adding an organic solvent to the mixture, milling the mixture through rolls to form a film of about 350 μm thick, and drying the film at 150° C. in vacuum. A disk having a predetermined diameter was punched from the dry film.

A negative electrode was prepared by applying lithium to a punched aluminum disk having a predetermined diameter, bonding lithium to the aluminum disk under pressure, and treating the disk in an electrolytic solution to form a lithium-aluminum alloy (Li-Al) alloy having a lithium content of 30 atom%.

A liquid electrolyte was prepared by dissolving 1 mol of lithium hexafluoroarsenide ($LiAsF_6$) to 1 liter of a mixture of 2-methyltetrahydrofuran and ethylene carbonate in a volume ratio of 1:1.

A cell as shown in FIG. 1 was fabricated using the positive electrode, negative electrode, and liquid electrolyte prepared above.

Figure 8:
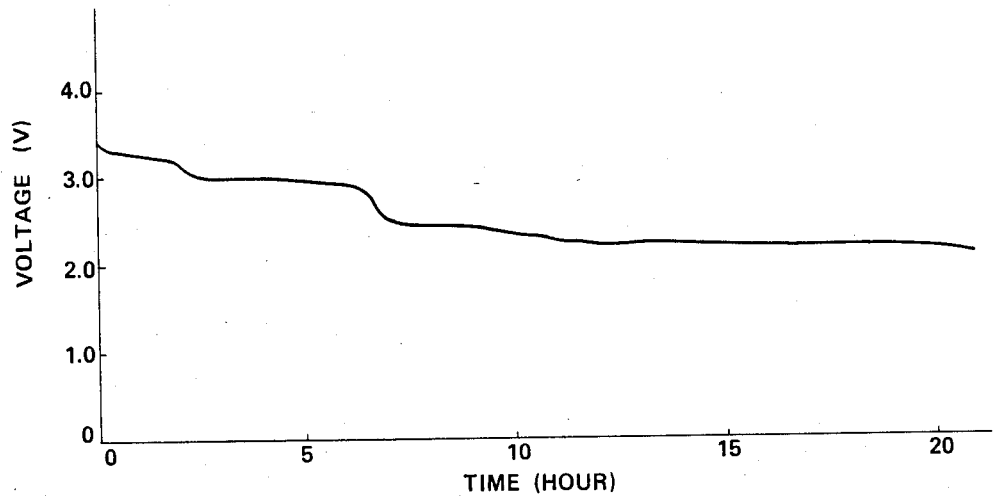

The cell was subjected to repetitive charging/discharging cycles at a charge/discharge current of 1 mA, a discharge terminating voltage of 2.0V, and a charge terminating voltage of 3.5V. A discharging curve was recorded on the 5th cycle and at the same time, the capacity of the cell was measured. The discharging curve is shown in FIG. 8 and the capacity is reported in Table 3.

The cell was also subjected to a constant capacity charge/discharge cycle test wherein the cell was discharged at a constant capacity of 6 mAH and charged to a terminating voltage of 3.5V. The number of maximum available cycles repeated until the capacity reached 3 mAH at a discharge terminating voltage of 2.0V is a cycle life, which is reported in Table 4.

EXAMPLE 7

A cell was fabricated by the same procedure as in Example 6 except that the liquid electrolyte used was prepared by dissolving 1 mol of lithium hexafluorophosphate ($LiPF_6$) to 1 liter of a mixture of ethylene carbonate and propylene carbonate in a volume ratio of 1:1.

The cell was subjected to the same constant capacity charge/discharge cycle test as in Example 6. The results is shown in Table 4.

EXAMPLE 8

A cell was fabricated by the same procedure as in Example 6 except that the liquid electrolyte used was prepared by dissolving 1 mol of lithium perchlorate ($LiClO_4$) to 1 liter of a mixture of propylene carbonate and tetrahydrofuran in a volume ratio of 1:1.

The cell was subjected to the same constant capacity charge/discharge cycle test as in Example 6. The results is shown in Table 4.

TABLE 3

| Example | Positive electrode active material | Current (mA) | Capacity (mAH) |
|---------|-----------------------------------|--------------|----------------|
| Example 6 | $Li_{0.3}V_2O_5$ | 1 | 20.9 |

TABLE 3-continued

| Example | Positive electrode active material | Current (mA) | Capacity (mAH) |
|---|---|---|---|
| Comparative Example | $V_2O_5$ | 1 | 8.0 |

TABLE 4

| Example | Electrolyte | Negative electrode | Cycle life (cycles) |
|---|---|---|---|
| Example 6 | $LiAsF_6$ | 30 at % Li—Al | 243 |
| Example 7 | $LiPF_6$ | 30 at % Li—Al | 216 |
| Example 8 | $LiClO_4$ | 30 at % Li—Al | 231 |

As is evident from the data of Tables 3 and 4, the cells of Examples 6 to 8 have a large capacity at a potential of 2 volts or higher and an extended cycle life. The present invention provides an improved non-aqueous electrolyte secondary cell having a high discharge capacity at a high potential and is thus of great industrial value.

We claim:

1. A non-aqueous electrolyte secondary cell comprising a positive electrode active material selected from materials represented by formulae (1) through (6):

$$Li_xMo_xV_{2-x}O_5 \quad (1)$$

$$Li_xW_xV_{2-x}O_5 \quad (2)$$

$$Li_yMo_zV_{2-z}O_5 \quad (3)$$

$$Li_yW_zV_{2-z}O_5 \quad (4)$$

$$Li_{m+n}Mo_mW_nV_{2-m-n}O_5 \quad (5)$$

$$\beta\text{-}Li_qV_2O_5 \quad (6)$$

wherein $x \leq 1$, $z < y \leq 1$, $m+n \leq 1$, and $0.1 \leq q \leq 0.6$, a negative electrode active material of lithium or a lithium alloy capable of occluding and releasing lithium, and an electrolyte consisting essentially of a non-aqueous material which allows lithium ions to migrate for electrochemical reaction with said positive electrode active material.

2. The cell of claim 1 wherein the lithium alloy contains about 10 to about 60 atom% of lithium.

3. The cell of claim 1 wherein the lithium alloy is a lithium-aluminum alloy.

4. The cell of claim 1 wherein the electrolyte is at least one member selected from $LiClO_4$, $LiAsF_6$, and $LiPF_6$.

* * * * *